Jan. 25, 1927.
P. E. KING
1,615,764
WICKLESS TORCH FOR SOLDERING IRONS
Filed April 2, 1923
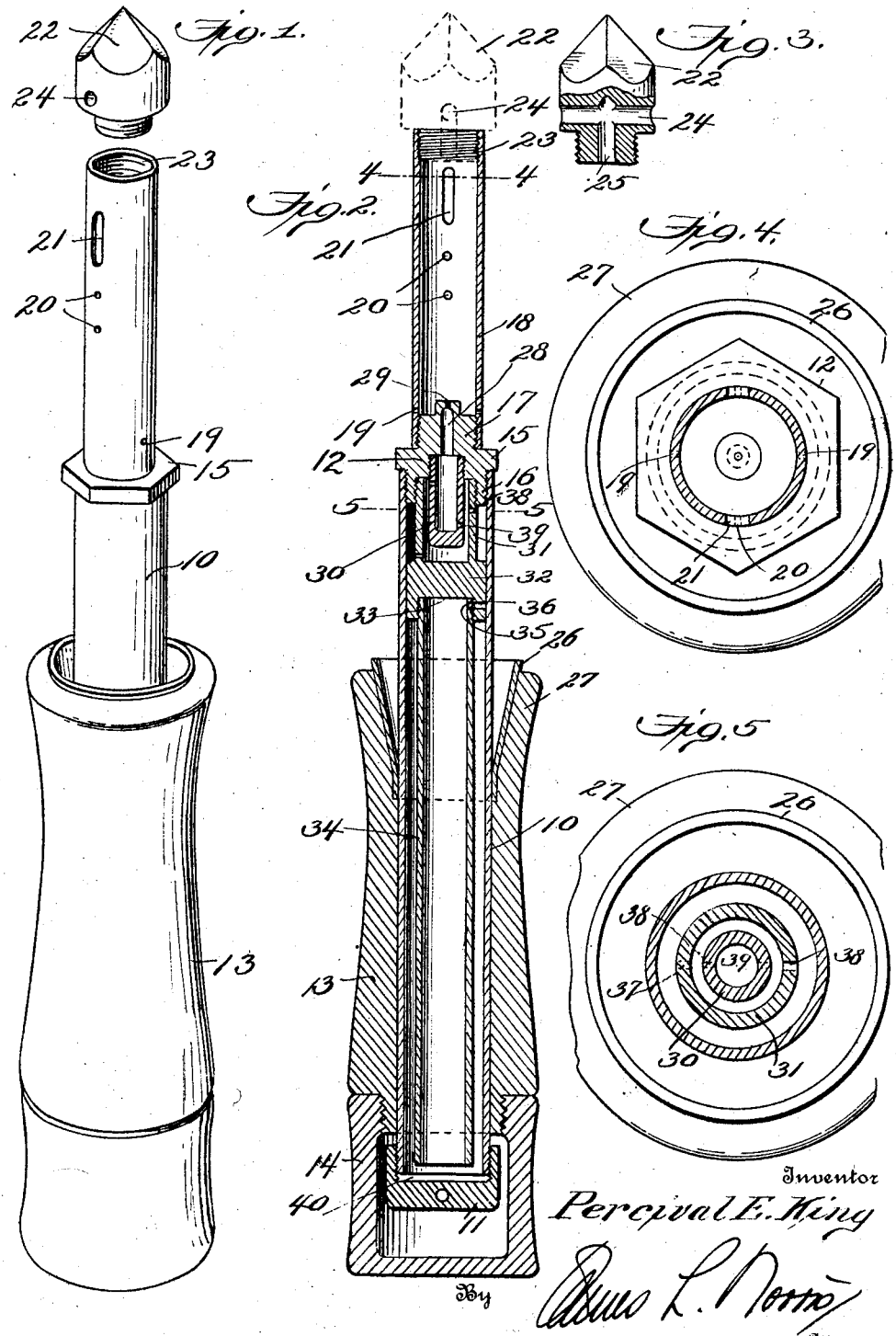
Inventor
Percival E. King
By
Attorney Patented Jan. 25, 1927.

1,615,764

UNITED STATES PATENT OFFICE.

PERCIVAL E. KING, OF SEYMOUR, CONNECTICUT.

WICKLESS TORCH FOR SOLDERING IRONS.

Application filed April 2, 1923. Serial No. 629,425.

The present invention relates to self-heating soldering irons and particularly to devices of this nature in which the fuel used in heating the soldering iron is vaporized before being fed to the combustion chamber by the heat of the flame used in heating the soldering tip.

An object of the invention is to provide a wickless torch adapted to the use of liquid fuel, which may be used in any position, and which is so constructed that the liquid fuel will not flood the combustion chamber.

Another object is to provide means whereby an effective priming effect may be obtained in the torch.

In the drawings:—

Fig. 1 is an elevation of the torch with the soldering tip removed and showing the torch and tip somewhat in perspective.
Fig. 2 is a longitudinal section of the torch showing the arrangement of the various compartments therein.

Fig. 3 is a detail view of the soldering tip showing part thereof in section and disclosing the passageways for the vaporized fuel.

Fig. 4 is a section on the line 4—4, Fig. 2, showing the relation of the various air vents to each other.

Fig. 5 is a section on the line 5—5, Fig. 2, showing the fuel passageways within the connecting member between the burner and fuel reservoir.

Referring to the drawings by reference numerals, the same numerals designating the same parts in all views of the drawings, 10 designates a fuel reservoir, the lower end of which is closed by a cap 11, which is threaded thereto, and the upper end of which is closed by a plug 12 which forms a coupling between the reservoir and the burner to be described. The reservoir is preferably surrounded by a casing of wood or other suitable material of low heat conductivity, forming a handle 13. The said handle may be provided at its lower end with a suitable cap 14 threaded thereto and enclosing the cap 11. The plug 12 is preferably provided with a shoulder 15 from which projects in opposite directions threaded extensions 16 and 17, the former being adapted to fit in the end of the reservoir and the latter serving as a connection between the plug 12 and the burner tube 18.

The burner tube may be of any suitable construction and as shown is provided in its walls with suitable air vents 19, 20 and 21, variously placed throughout its length, the vents 19 being preferably four in number equally spaced about the lower end of the tube; the vents 20 lying on diametrically opposite sides of the tube and intermediate the length thereof, and the vents 21 being preferably elongated as shown, four in number, and located near the upper end of the tube. A soldering tip 22 of any suitable construction may be provided having a shouldered rear end adapted to fit in said tube and to be secured thereto in any suitable manner, as by screw threads. A passageway 24 may be formed diametrically through said soldering tip and connecting with a passageway 25 at right angles thereto and leading to the rear end of the tip. The tube 18 and the walls of the chamber 10 are preferably constructed of metal having a high coefficient of heat conductivity so that when the torch is in use, the heat from the flame within the tube 18 will be conducted rearwardly and the fuel in the reservoir vaporized, thereby causing it to pass out into the burner in a manner which will be hereinafter described.

In order to start the vaporization of the fuel a priming cup 26, preferably located toward the upper end of the fuel chamber and surrounding the same is provided. This cup may be, as shown, of conical shape and be housed within the flared end 27 of the handle 13.

To prevent a too rapid flow of vapor to the burner, and to prevent the flooding of said burner by liquid fuel, the vapor is made to pass from the reservoir to the burner by tortuous and very fine passageways in connection with certain intervening chambers as will hereinafter appear. In order to accomplish this, the following construction of parts is used in connection with the plug 12; the extension 17 is provided centrally with a bore 28 having a capillary communication 29 with the interior of the burner tube 18. Concentric with the bore 28 the plug 12 is counter-bored to receive the cartridge 30 and the extension 16 is likewise counter-bored concentrically with the bore 28 to receive the threaded end of the cartridge 31 with its walls lying in spaced relation to the cartridge 30 and to the walls of the reservoir 10. The lower end of the cartridge 31 is enlarged at 32 so as to form a head adapted to fit loosely within the bore of the reservoir 10, to permit the passage of fluids between its outer surface and the surrounding wall of said reservoir as at 31ª. The head 32 is in turn counter-sunk at 33 on its rearward face and screw threaded to receive the end of a tube 34 which extends preferably to near the bottom of the reservoir. The wall of the counter-sunk portion 33 and the wall of the tube 34 connecting therewith are provided with apertures 35 and 36 adapted to be brought into alignment to form a passageway for vapors formed within the tube 34 and to permit their passage into the chamber formed between the wall of the cartridge 31 and the wall of the reservoir 10. Passageways 37 and 38 connect said chamber with the interior of the cartridge 31 and the said interior is in turn connected with the interior of the cartridge 30 by ducts 39, the interior of the cartridge 30 constituting a vapor expansion chamber and the bore 28 constituting a vapor reducing chamber. The annular space lying between the wall of the reservoir and the wall of the cartridge 31 may be known as a vapor chamber. A tight fit between the cap 11 and the reservoir 10 may be effected by providing within the cap 11, a gasket or washer 40.

In using my device the cap 11 may be removed and a suitable liquid fuel, such as alcohol, placed within the reservoir chamber, whereupon the cap may be replaced and the liquid may be vaporized by ingiting a priming charge placed within the priming cup 26, heat therefrom being conducted rearwardly by the metallic parts as described above and an initial amount of the liquid in the reservoir is thereby vaporized, and when the flow is sufficiently strong the vapor within the tube 18 may be ignited either through the slots 21, when the tip 22 is in place, or through the open end, when said tip is removed, according to whether the device is to be used as a soldering iron or as a torch. As the vapor rises through the tube 18 air will be drawn in through the vents 19 mixing therewith and additional air will be drawn through the apertures 21, but when the device is used as a soldering iron the flames and products of combustion will escape through the apertures 21, or they may escape through the vents 25 and 24. Also the vapors may be ignited at the ends of the passageway 24 and the vents 21 may serve merely to feed air to the gas.

What is claimed as new is:—

1. A torch comprising a fuel reservoir, a burner, a coupling member between the burner and fuel reservoir and having an aperture therethrough communicating with the burner, said coupling member having concentrically arranged devices associated therewith with apertured walls spaced apart, one of said devices having a lower enlarged end fitted within the bore of the reservoir and forming a narrow vapor space between its outer surface of said lower end and the wall of the reservoir to provide a vapor chamber in communication with the burner, and a tube extending from the said lower enlarged end of one of the devices into the reservoir and terminating near the bottom of the latter.

2. A torch comprising a fuel reservoir, a burner, a coupling member between the burner and fuel reservoir and having an aperture therethrough communicating with the burner, said coupling member having concentrically arranged devices associated therewith with apertured walls spaced apart, one of said devices having a lower enlarged end fitted within the bore of the reservoir and forming a narrow vapor space between its outer surface and the wall of the reservoir to provide a vapor chamber in communication with the burner, a tube extending from the said lower enlarged end of one of the devices into the reservoir and terminating near the bottom of the latter, and a priming cup surrounding the reservoir and disposed to cause the flames therefrom to act on the coupling member and said devices.

3. A torch comprising a reservoir, a burner tube, a coupling member between the burner tube and reservoir and having an aperture therethrough, said coupling member being provided with a depending hollow extension with a lower enlarged end which is intermediately reduced to form a space between the said enlarged end and the wall of the reservoir in which the end is fitted, the hollow extension being also of less diameter than the wall of the reservoir connected to the coupling member, and a hollow member also connected to the coupling member and provided with a lower closed end and located within and spaced from the hollow extension, the hollow extension and hollow member having openings in their walls for the passage therethrough of vapor to the aperture of the coupling member for discharge into the burner.

4. A torch comprising a reservoir, a burner, a coupling member interposed between the reservoir and burner and of plug form to provide a partition between said reservoir and burner, said coupling member having an aperture therethrough communicating with the burner and also provided with a hollow extension projecting into said reservoir, the coupling member being intermediately reduced in diameter to form a space between the hollow extension and the wall of the reservoir, the hollow extension being formed with a lower enlarged solid end of slightly less diameter than the wall of the reservoir to provide a minimized space between the said end and wall of the reservoir for passage of vapor therethrough, and a cavitied device forming a chamber and connected to the coupling member and communicating with the aperture of the latter, said cavitied device projecting downwardly into the hollow extension and being of less diameter than the latter, the cavitied device and extension having in their walls apertures at different locations to form tortuous passages for movement of vapor therethrough towards the aperture in the coupling member.

In testimony whereof I affix my signature.

PERCIVAL E. KING.